United States Patent [19]
Wreesmann et al.

[11] Patent Number: 5,292,815
[45] Date of Patent: Mar. 8, 1994

[54] PEROXIDE VULCANIZED RUBBER COMPOSITION

[75] Inventors: Carel T. J. Wreesmann, Naarden; Auke G. Talma; Willem C. Endstra, both of Bathmen, all of Netherlands

[73] Assignee: Akzo N.V., Arnhem, Netherlands

[21] Appl. No.: 967,354

[22] Filed: Oct. 28, 1992

[30] Foreign Application Priority Data

Oct. 29, 1991 [EP] European Pat. Off. ........ 91202788.5

[51] Int. Cl.$^5$ ................................................. C08F 8/00
[52] U.S. Cl. .................................... 525/259; 525/261; 525/264; 525/282
[58] Field of Search ............... 525/259, 261, 264, 282

[56] References Cited

U.S. PATENT DOCUMENTS

| | | | |
|---|---|---|---|
| 2,925,407 | 2/1960 | Goldberg | 260/83.3 |
| 3,335,124 | 8/1967 | Larsen | 260/94.9 |
| 4,018,852 | 4/1977 | Schober | 260/878 |
| 4,857,571 | 8/1989 | Reiter et al. | 524/248 |

FOREIGN PATENT DOCUMENTS

| | | |
|---|---|---|
| 738500 | 7/1966 | Canada . |
| 0346863 | 6/1989 | European Pat. Off. . |
| 1254659 | 1/1961 | France . |
| 1257913 | 2/1961 | France . |
| 1259094 | 3/1961 | France . |

OTHER PUBLICATIONS

Galanti, A. V. and Scola, D. A., *Journal of Poly. Sci.*, Polymer Chemistry Edition, vol. 19, 1981, pp. 451–475.
Galanti, A. V. et al., *Journal of Poly. Sci.*, Polymer Chemistry Edition, vol. 20, pp. 233–239 (1982).
Dataleaflet "Perkacit MBTS".

*Primary Examiner*—Bernard Lipman
*Attorney, Agent, or Firm*—Ralph J. Mancini; Louis A. Morris

[57] ABSTRACT

A peroxide-vulcanized rubber composition which comprises the vulcanization reaction product of a rubber, an organic peroxide, a biscitraconimido compound and a radical scavenger, is disclosed. The peroxide-vulcanized rubber compositions of the disclosure have significantly improved physical properties. Also disclosed are a peroxide-vulcanization process carried out in the presence of a biscitraconimido compound and a radical scavenger to control the scorch time and the use of a biscitraconimido compound and a radical scavenger to control scorch time in the peroxide-vulcanization of rubber.

13 Claims, No Drawings

PEROXIDE VULCANIZED RUBBER COMPOSITION

FIELD OF INVENTION

The present invention relates to a rubber composition having improved physical properties. More particularly, it relates to a peroxide-vulcanized rubber composition which is vulcanized in the presence of a biscitraconimido compound and a radical scavenger to control the scorch time.

BACKGROUND OF THE INVENTION

It is essential with the injection molding and continuous vulcanization of rubber articles that the moldable rubber in the extruder and in the conveyor to the mould remain processable, i.e. readily flowable, as long as possible. In the mould, however, the rubber should crosslink as rapidly as possible. Faster crosslinking permits a higher rate of production.

Since the viscosity of the moldable rubber decreases with higher temperatures, it is desirable to maintain the temperature in the extruder and the conveyor to the mould as high as possible without risking premature crosslinking. In practice, the maximum processing temperature in the extruder/conveyor is at least 30° to 50° C. below the temperature in the mould (vulcanization temperature). A small increase in the processing temperature and/or extension of the residence time in the extruder/conveyor can, above a certain critical level (or threshold-value), lead to premature crosslinking, which is characterized by wrinkled or "scorched" spots on the smooth surface of the rubber article produced. This phenomenon is commonly known as "scorch".

The tendency of a rubber to scorch under commercial operating conditions may be measured by means of an oscillating disc curemeter, which procedure is described in International Standard ISO 3417. A test piece of rubber is maintained at an elevated temperature. A biconical disc is embedded in the test piece and is oscillated. This action exerts a shear strain on the test piece and the force (torque) required to oscillate the disc depends on the degree of vulcanization of the rubber at the elevated temperature at a certain time. The torque is recorded as a function of time.

Indicative of the scorch time of a rubber is the $t_2$ value, which is the time for the torque to increase 0.1 Nm above the minimum torque, measured in the curemeter. Indicative of the necessary residence time in the mould is the $t_{90}$ value (vulcanization time), which is the time required to obtain 90% of full torque development. The higher the $t_{90}$ value, the longer the residence time in the mould. The final properties of the rubber article depend, to a significant extent, on the crosslink density (degree of crosslinking). Indicative of the crosslink density is the highest torque measured in the curemeter. Another way of measuring the above-mentioned values is described in International Standard ISO 6502.

Until now, the scorching problem has been solved at the expense of either a significantly longer production time ($t_{90}$) or an undesirable worsening of the properties of the rubber compositions. For example, typical antioxidants can be used to lengthen the scorch time but invariably lead to a significantly lower crosslink density in the rubber product. It is also possible to extend the scorch time by, for example, adding initiators which have a longer half-life period. Such alternative, however, also results in a longer crosslinking period and hence an undesired lowering of the production rate. Combinations of some coagents with antioxidants have been tried, but all have one or more disadvantages in either compression set, crosslink density or production time.

EP 0 346 863 describes polymer compositions containing an organic peroxide, a hydroquinone derivative, and a coagent such as triallyl cyanurate to extend the scorch time ($t_2$2).

U.S. Pat. No. 4 857 571 describes a crosslinkable rubber to which a peroxide, a coagent, such as acrylate, methacrylate, or triallyl cyanurate, and a special scorch retardant containing a phenol group and an amino group, have been added.

FR 1 259 094 describes the use of bismaleimides and biscitraconimides in the vulcanization of saturated polymers in the presence of organic peroxides. Although it is possible to add other vulcanization agents no details are given. Furthermore, this publication does not teach or suggest the process of the present invention nor the advantages which flow therefrom.

In CA 738 500 rubber vulcanization processes are disclosed wherein bismaleimides and biscitraconimides are employed as vulcanization agents in the absence of free radical initiators, optionally in the presence of thiazole type accelerators. The rubbers obtained by this process are said to have a better resistance to oxidative aging than sulfur-vulcanized rubbers. In addition, rubber stocks containing the bismaleimides and biscitraconimides are usable in the presence of metals which are normally tarnished by those stocks and can be processed at higher temperatures than sulfur-containing rubber stocks without scorching. CA 738 500 also discloses a process for the vulcanization of polyurethane rubbers using a bismaleimide or biscitraconimide curing agent and a free radical initiator. Polyurethane rubber vulcanizates cured in this manner exhibit a higher tear strength, better resistance to aging and a higher tensile strength at high temperature. Although this Canadian patent mentions that antioxidants may be used in the vulcanization processes, no specific details are given. Further, this patent does not teach or suggest the process of the present invention or the advantages which flow therefrom.

U.S. Pat. No. 4 018 852 relates to crosslinkable polyethylene compositions comprising an organic peroxide, an organic hydroperoxide and a triallyl compound This patent provides a detailed discussion of the desirability of reducing scorching by extending the scorch time, as well as the desirability to maintain a relatively short production time and good physical properties in the rubber product.

The present approach to achieve long scorch times in peroxide vulcanization is to have the highest possible $t_2:t_{90}$ ratio (scorch ratio), without any of the other physical properties of the rubber being significantly altered.

Accordingly, it remains desirable to lengthen the scorch time in peroxide rubber vulcanization processes without significantly lengthening production time or negatively influencing the advantageous properties of the rubber product.

The present invention provides a solution to the above problems by the use of a combination of a biscitraconimido compound and a radical scavenger in the peroxide-vulcanization of rubbers.

SUMMARY OF THE INVENTION

The present invention generally relates to a peroxide-vulcanized rubber composition which comprises the vulcanization reaction product of:

(A) 100 parts of at least one natural or synthetic rubber;

(B) 0.04 to 10 parts by weight of an organic peroxide;

(C) 0.5 to 10 parts by weight of a biscitraconimido compound represented by formula I:

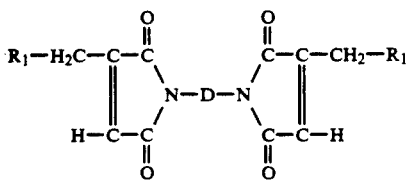

wherein D is a divalent group chosen from the group of alkylene, alkarylene, cycloalkylene, arylene, aralkylene, and alkenylene, and $R_1$ is hydrogen or an alkyl group with 1–18 carbon atoms; and (D) 0.1 to 10 parts by weight of a radical scavenger, all amounts being based on the weight of said rubber.

DETAILED DESCRIPTION OF THE INVENTION

The present invention generally relates to a peroxide-vulcanized rubber composition which comprises the vulcanization reaction product of:

(A) 100 parts of at least one natural or synthetic rubber;

(B) 0.04 to 10 parts by weight of an organic peroxide;

(C) 0.5 to 10 parts by weight of a biscitraconimido compound represented by formula I:

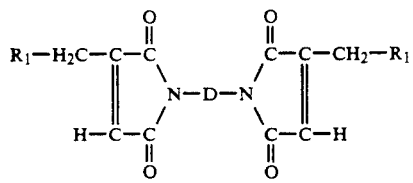

wherein D is a divalent group chosen from the group of alkylene, alkarylene, cycloalkylene, arylene, aralkylene, and alkenylene, and $R_1$ is hydrogen or an alkyl group with 1–18 carbon atoms; and (D) 0.1 to 10 parts by weight of a radical scavenger, all amounts based on the weight of said rubber.

In addition, the present invention relates to a vulcanization process carried out in the presence of the biscitraconimido compounds of the formula I and a radical scavenger and the use of the combination of a biscitraconimido compound and a radical scavenger to control scorch time in the peroxide-vulcanization of rubbers.

The present invention provides the ability to achieve, during vulcanization, a long scorch time without the crosslink density and the crosslinking time ($t_{90}$) being adversely affected. Furthermore, the invention also provides improved rubber compositions.

The present invention is applicable to all natural and synthetic rubbers. Examples of such rubbers include, but are not limited to, natural rubber (NR), ethylene-propylene-dienemonomer terpolymers (EPDM), styrene-butadiene rubber (SBR), acrylonitrile-butadiene rubber (NBR), hydrogenated acrylonitrile-butadiene rubber (HNBR), polyisoprene rubber (IR), acrylonitrile-butadiene-styrene terpolymers (ABS), styrene-butadiene-styrene rubber (SBS), styrene-isoprene-styrene rubber (SIS), polychloroprene rubber (CR), polybutadiene, halogenated isoprene-isobutylene rubber (BIIR or CIIR), ethylene-propylene copolymers (EPM), ethylene-vinylacetate copolymers (EVA), chloro polyethylene (CM/CPE), chlorosulfonyl polyethylene (CSM), high density polyethylene (HDPE), low density polyethylene (LDPE, LLDPE), silicone rubber, as well as combinations of two or more of these rubbers and combinations of one or more of these rubbers with other rubbers and/or thermoplastics.

Examples of organic peroxides which may be used in the present invention include but are not limited to di-tert-butyl peroxide, tert-butyl cumyl peroxide, bis(tert-butylperoxyisopropyl)benzene, dicumyl peroxide, butyl 4,4-bis(tert-butylperoxy)valerate, 2,5-bis(tert-butylperoxy)-2,5-dimethylhexane, 2,5-bis(tert-butylperoxy)-2,5-dimethyl-3-hexyne, tert-butyl 3-isopropenylcumyl peroxide, bis(3-isopropenylcumyl) peroxide, 1,1-bis(tert-butylperoxy)-3,3,5-trimethylcyclohexane, tert-butyl peroxybenzoate, dibenzoyl peroxide, and bis(2,4-dichlorobenzoyl) peroxide. Combinations of organic peroxides can also be used. Preferably, 1,1-bis(tert-butylperoxy)-3,3,5-trimethylcyclohexane, bis(tert-butylperoxyisopropyl)benzene, and tert-butyl 3-isopropenylcumyl peroxide are used as organic peroxides.

Biscitraconimido compounds are known and can be prepared by the methods disclosed in, "The Synthesis of Biscitraconimides and Polybiscitraconimides," Galanti, A. V. and Scola, D. A., Journ. of Poly. Sci.: Polymer Chemistry Edition, Vol. 19, pp. 451–475, (1981), the disclosure of which is hereby incorporated by reference. "The Synthesis of Bisitaconamic Acids and Isomeric Bisimide Monomers," Galanti, A. V. et al., Journ. Poly. Sci.: Polymer Chemistry Edition, Vol. 20, pp. 233–239 (1982) also discloses a method for the preparation of biscitraconimido compounds in the form of an isomeric mixture of the citraconic and itaconic imides, the disclosure of which is also hereby incorporated by reference.

The more preferred biscitraconimido compounds of the present invention represented by the formula I include, but are not limited to, the biscitraconimido compounds wherein D is chosen from the group of $C_1$–$C_{18}$-alkylene, $C_7$–$C_{30}$-alkarylene, $C_3$–$C_{18}$-cycloalkylene, $C_6$–$C_{30}$ arylene, $C_7$–$C_{30}$-aralkylene, and $C_2$–$C_{18}$-alkenylene and R is hydrogen or a $C_1$–$C_{18}$-alkyl group. More preferably, $R_1$ is hydrogen.

More specific examples of some of the biscitraconimido compounds useful in the invention, include but are not limited to the following:

1,2-N,N'-dimethylene-biscitraconimide;
1,2-N,N'-trimethylene-biscitraconimide;
1,5-N,N'-(2-methyl-pentamethylene)-biscitraconimide; and
N,N'-meta-phenylene-biscitraconimide.

Examples of radical scavengers include but are not limited to antioxidants and mercapto derivatives. Any typical antioxidant for rubber vulcanization may be employed. Preferably, a phenolic antioxidant is used. More specific examples of some phenolic antioxidants are:

2,6-bis(tert-butyl)-4-methylphenol, bis(2-hydroxy-5-methyl-3-(1-methylcyclohexyl) phenylmethane, 2,5-bis(tert-amyl)hydroquinone, tert-butylhydroquinone and 2,6-bis(tert-butyl)-4-dimethylaminomethylphenol. As mercapto derivative dibenzothiazyl disulfide is preferred.

The amount of organic peroxide, based on 100 parts rubber, is from about 0.04–10 parts by weight, preferably from about 1–4 parts by weight. The amount of biscitraconimido compound in the vulcanizable rubber composition is from about 0.5 to 10 parts by weight, preferably from about 1–4 parts by weight. The amount of radical scavenger added to the composition is from about 0.1–10 parts by weight, preferably from about 0.1–4 parts by weight.

Other conventional rubber additives may also be employed in their usual amounts. For example, reinforcing agents such as carbon black, silica, clay, chalk and calcium carbonate may be included in the rubber composition. Other additives such as tackifiers, waxes, further antioxidants, pigments, UV-stabilization agents, antiozonants, blowing agents, extender oils, like paraffinic oils, may also be included alone or in combination.

The present invention also relates to the vulcanization of a vulcanizable rubber composition containing a natural or a synthetic rubber with from about 0.04 to 10 parts by weight per 100 parts rubber, of an organic peroxide, comprising the step of vulcanizing said rubber at a temperature of from about 80° C. to about 300° C. for a period of from about 30 seconds u to about 10 hours to crosslink the rubber composition, characterized in that said vulcanizable rubber composition further comprises from about 0.5 to about 10 parts by weight of a biscitraconimido compound represented by formula I and from about 0.1 to about 10 parts by weight of a radical scavenger, all amounts being based on 100 parts by weight of said rubber.

All of the additives mentioned above with respect to the rubber composition may also be present during the vulcanization process of the invention.

Preferably, the process is carried out at a temperature of from about 120° C. to about 180° C. for a period of from about 2 minutes up to about 2 hours. The processing temperature, i.e. the temperature during extrusion and conveying, ranges from about 50° C. to about 150° C. To carry out the process according to the invention known techniques and machines can be used.

The present invention also comprises the use of the combination of a biscitraconimido compound of formula I and a radical scavenger to control scorch time in the peroxide-vulcanization of rubber.

The invention is further illustrated by the following non-limiting examples.

Materials

Materials will be added to the process in parts per hundred based on the rubber (phr).

| | |
|---|---|
| Rubbers: | Ethylene propylene diene monomer (EPDM: third monomer is cyclopentadiene) Ethylene vinylacetate (EVA) |
| Extender oil: | paraffinic oil |
| Peroxides: | 1,1-bis(tert-butylperoxy)-3, 3,5-trimethylcyclohexane bis(tert-butylperoxyisopropyl)benzene |
| Coagents: | triallyl cyanurate ("TAC") ethylene glycol dimethacrylate ("EDMA") N,N'-meta-phenylene-bismaleimide ("HVA-2") |
| | Triallyl trimellitate ("TATM") 1,2-N,N'-dimethylene-bis(dimethyl)maleimide ("BDMM-C2") 1,2-N,N'-dimethylene-biscitraconimide ("BCI-C2") 1,2-N,N'-trimethylene-biscitraconimide ("BCI-C3") 1,5-N,N'-(2-methyl-pentamethylene)-biscitraconimide ("BCI-C6") N,N'-meta-phenylene-biscitraconimide ("BCI-MP") |
| Radical scavengers: | 2,6-bis(tert-butyl)-4-methylphenol ("BHT") tert-Butylhydroquinone ("THBQ") 2,5-bis(tert-amyl)hydroquinone ("DAHQ") bis(2-hydroxy-5-methyl-3-(1-methylcyclohexyl) phenyl)methane ("WSP") 2,6-bis(tert-butyl)-4-dimethylaminomethylphenol ("E703") polymerized 2,2,4-trimethyl-1,2-dihydroquinoline ("TQ") dibenzothiazyl disulphide ("MBTS") |

Measuring of the Rheological Properties (Unless Mentioned Otherwise)

The rheological behavior of the rubber compositions was measured on a Monsanto rheometer TM-100 ODR, micro die (180° C.: 30 minutes/range 10 N.m/arc=3°). The rheological behavior gives an indication of the scorch time, the vulcanization time and the crosslink density in the rubber (International Standard ISO 3417).

Measuring of the Mechanical Properties

For the mechanical tests the rubber compositions were crosslinked under pressure at 150° C. during 15 minutes.

Moduli were measured according to International Standard ISO 37/2 Dumb-bell.

Tear and tensile strength were determined on a Zwick-1445 tensile tester according to International Standards ISO 37/2-Db en 34/2-Db, respectively.

The compression set was determined at 100° C. during 72 hours according to International Standard ISO R-815. The IRHD-hardness was determined according to International Standard ISO 48.

The rubber compositions were aged in a hot-air oven at 100°–120° C. during 168 hours and subsequently stored overnight at room temperature.

EXAMPLES 1–8 AND COMPARATIVE EXAMPLES A-B 100 parts EPDM, 50 phr carbon black and 10 phr paraffinic oil were mixed over 5 minutes in a 1-liter Banbury-mixer at 120° C. 4.2 phr of a 40% formulation of bis(tert-butylperoxyisopropyl)benzene and different amounts of BHT and BCI-C2 were added to the rubber mixture on a two-roll mill (friction ratio 1:1.2) over 5 minutes at 40° C. The results of the rheological measurements during the vulcanization at 180° C. are listed in Table 1.

TABLE 1

| Ex. no. | BCI-C2 (phr) | BHT (phr) | $t_s2$ (min.) | $t_{90}$ (min.) | $t_s2/t_{90}$ | Δtorque (N.m) |
|---|---|---|---|---|---|---|
| control | — | — | 1.06 | 8.48 | 0.125 | 7.12 |
| A | 1 | — | 1.07 | 8.20 | 0.13 | 9.54 |
| B | 4 | — | 1.16 | 7.70 | 0.15 | 11.54 |
| 1 | 1 | 0.9 | 1.29 | 8.06 | 0.16 | 8.18 |
| 2 | 1 | 1.75 | 1.34 | 8.38 | 0.16 | 7.14 |
| 3 | 1 | 3.5 | 1.58 | 8.30 | 0.19 | 5.91 |
| 4 | 2 | 1.75 | 1.46 | 7.70 | 0.19 | 8.08 |
| 5 | 2 | 3.5 | 1.69 | 7.50 | 0.225 | 7.12 |
| 6 | 3 | 1.75 | 1.49 | 7.25 | 0.205 | 8.77 |

TABLE 1-continued

| Ex. no. | BCI-C2 (phr) | BHT (phr) | $t_s2$ (min.) | $t_{90}$ (min.) | $t_s2/t_{90}$ | Δtorque (N.m) |
|---|---|---|---|---|---|---|
| 7 | 3 | 3.5 | 1.52 | 8.01 | 0.19 | 7.91 |
| 8 | 4 | 3.5 | 1.73 | 8.88 | 0.195 | 7.81 |

$t_{90}$: vulcanization time
Δtorque: measure of crosslink density

The results show that processes whereto a biscitraconimido compound is added but no antioxidant (Comparative Examples A and B) do not show a remarkable difference in scorch time as compared to the control to which no coagent and no antioxidant is added. The crosslink density of the crosslinked rubber, however, is drastically increased. The addition of BHT to the rubber compositions improves the scorch ratio compared to Comparative Examples A and B during the vulcanization, while the vulcanization time and the crosslink density of the crosslinked rubber have not significantly changed with respect to the control rubber.

EXAMPLE 9 AND COMPARATIVE EXAMPLES C-D 100 parts EPDM, 50 phr carbon black and 10 phr paraffinic oil were mixed over 5 minutes in a 1-liter Banbury-mixer at 120° C. 4.2 phr of a 40% formulation of bis(tert-butylperoxyisopropyl)benzene, TBHQ and coagents were added to this rubber mixture on a two-roll mill (friction ratio 1:1.2) over 5 minutes at 40° C. The results of the rheological measurements during the vulcanization at 180° C. are listed in Table 2.

TABLE 2

| Ex. no. | coagent | TBHQ (phr) | $t_s2$ (min.) | $t_{90}$ (min.) | $t_s2/t_{90}$ | Δtorque (N.m) |
|---|---|---|---|---|---|---|
| control | — | — | 1.06 | 8.48 | 0.125 | 7.12 |
| 9 | BCI-C2 (1 phr) | 0.33 | 1.84 | 9.18 | 0.20 | 7.39 |
| C | TAC (1 phr) | 0.33 | 1.69 | 10.56 | 0.16 | 6.59 |
| D | TATM (1.3 phr) | 0.33 | 1.86 | 10.65 | 0.175 | 6.38 |

$t_{90}$: vulcanization time
Δtorque: measure of crosslink density

The results from Table 2 show that the vulcanization time and crosslink density of a rubber composition according to the invention (Example 9) are comparable to those of a rubber composition vulcanized without coagent and antioxidant (control). The scorch time and scorch ratio are, however, greatly improved by the addition of the combination of a biscitraconimido compound and an antioxidant compared to the control. It is also clear from the results that the addition of other coagents to the rubber composition could improve the scorch time (Comparative Examples C and D). However, the vulcanization time is then too long.

EXAMPLES 10-13 AND COMPARATIVE EXAMPLES E-H

A rubber mixture of 100 parts EPDM, 50 phr carbon black and 10 phr paraffinic oil was mixed on a Banbury mixer over 5 minutes at a maximum temperature of 150° C. 2.1 phr of a 40% formulation of bis(tert-butylperoxyisopropyl)benzene, different coagents and 1.75 phr BHT were mixed over 5 minutes on a two-roll mill (friction ratio 1:1.2) at a temperature of 40°-50° C. The results of the rheological tests during vulcanization at 180° C. are listed in Table 3.

TABLE 3

| Ex. no. | coagent (phr) | BHT (phr) | $t_s2$ (min.) | $t_{90}$ (min.) | $t_s2/t_{90}$ | Δtorque (N.m) |
|---|---|---|---|---|---|---|
| control | — | — | 1.36 | 9.7 | 0.14 | 5.0 |
| 10 | BCI-C2 (1.00) | 1.75 | 2.02 | 9.2 | 0.22 | 5.3 |
| 11 | BCI-C3 (1.00) | 1.75 | 1.80 | 9.0 | 0.20 | 5.2 |
| 12 | BCI-C6 (1.20) | 1.75 | 1.91 | 9.1 | 0.21 | 5.2 |
| 13 | BCI-MP (1.20) | 1.75 | 1.91 | 9.1 | 0.21 | 5.7 |
| E | BDMM-C2 (1.10) | 1.75 | 2.30 | 12.8 | 0.18 | 2.1 |
| F | TAC (1.00) | 1.75 | 2.02 | 11.9 | 0.17 | 4.0 |
| G | EDMA (1.00) | 1.75 | 2.02 | 10.1 | 0.20 | 4.3 |
| H | HVA-2 (1.05) | 1.75 | 1.33 | 8.3 | 0.16 | 5.9 |

$t_{90}$: vulcanization time
torque: measure of crosslink density

The results from Table 3 show that the combination of BHT and biscitraconimido compounds gives longer scorch times during the vulcanization of the rubber compositions (Examples 10-13) again without disadvantages in either vulcanization time or crosslink density. The scorch time of HVA-2 (Comparative Example H) is even lower than the scorch time of the control rubber composition comprising no coagent and no antioxidant. Comparative Example E shows that a derivative structurally homologous to a biscitraconimido compound is far less efficient as a coagent than the biscitraconimido compounds. Comparative Examples F-G show that even with a good scorch time the vulcanization time can increase, slowing the production capacity. Also the crosslink density of these two Comparative Examples is worse than that of the control.

The compression set of some of the rubber compositions obtained from the previous examples, viz. 11, 13, F and G, was measured and compared to vulcanized rubber compositions whereto no antioxidant was added. The results are listed in Table 4. The percentages indicate the variation between the original shape and size and the shape and size after the material is compressed and then released from compression.

TABLE 4

| Ex. no. | coagents | no antioxidant CS | BHT (1.75 phr) CS |
|---|---|---|---|
| control | — | 19 | 32 |
| 11 | BCI-C3 (1 phr) | 12 | 15 |
| 13 | BCI-MP (1.2 phr) | 12 | 16 |
| F | TAC (1 phr) | 14 | 22 |
| G | EDMA (1 phr) | 16 | 21 |

CS: Compression set in %

The results listed in Table 4 show that the addition of an antioxidant to a composition comprising a biscitraconimido compound increased the compression set, but, unexpectedly, not to the same extent as the increased compression set of the control rubber composition comprising no coagent. The addition of TAC or EDMA to rubber compositions provide a larger increase of compression set than the rubber compositions according to the invention.

EXAMPLES 14–16 AND COMPARATIVE EXAMPLE I

A rubber mixture of 100 parts EPDM, 50 phr carbon black and 10 phr paraffinic oil was mixed on a Banbury mixer at a maximum temperature of 150° C. 2.1 phr of a 40% formulation of bis(tert-butylperoxyisopropyl)benzene, BCI-C3 and different antioxidants were added to the rubber mixture and mixed over 5 minutes on a two-roll mill (friction ratio 1:1.2) at a temperature of 40°–50° C. The rheological measurements (cure-temperature=180° C.) are listed in Table 5. Table 6 displays the mechanical properties of the vulcanized compositions.

TABLE 5

| Ex. no. | BCI-C3 (phr) | anti-oxidant (phr) | $t_s2$ (min.) | $t_{90}$ | $t_s2/t_{90}$ (min.) | $\Delta$torque (N.m) |
|---|---|---|---|---|---|---|
| control | — | — | 1.4 | 9.7 | 0.14 | 5.0 |
| I | 1.00 | — | 1.5 | 8.6 | 0.17 | 6.6 |
| 14 | 1.00 | BHT (1.75) | 1.8 | 9.0 | 0.20 | 5.2 |
| 15 | 1.00 | DAHQ (0.25) | 1.7 | 10.4 | 0.17 | 4.7 |
| 16 | 1.00 | E703 (0.5) | 2.4 | 10.2 | 0.23 | 5.0 |

$t_{90}$: vulcanization time
$\Delta$torque: measure of crosslink density

The results show that with the addition of a biscitraconimido compound and an antioxidant, a good search retardation is obtained compared with the vulcanization of the control rubber composition whereto no coagent and no antioxidant are added and compared with the vulcanization of a rubber composition whereto only coagent is added (Comparative Example I).

TABLE 6

| Ex. no. | BCI-C3 (phr) | anti-oxidant (phr) | E100% (MPa) | E200% (MPa) | E300% (MPa) | TS (MPa) | EAB (%) |
|---|---|---|---|---|---|---|---|
| control | — | — | 1.2 | 3.0 | 6.8 | 12.6 | 405 |
| I | 1.00 | — | 1.5 | 4.5 | — | 10.2 | 295 |
| 14 | 1.00 | BHT (1.75) | 1.3 | 3.2 | 7.0 | 11.8 | 400 |
| 15 | 1.00 | DAHQ (0.25) | 1.2 | 2.8 | 6.2 | 13.3 | 450 |
| 16 | 1.00 | E703 (0.5) | 1.3 | 3.2 | 6.7 | 17.6 | 535 |

E100–300%: E-modulus at 100–300% elongation
TS: Tensile strength
EAB: Elongation at break The control and Examples 14–15 show that the addition of antioxidant and a biscitraconimido compound gives the same mechanical properties or even improves them (Example 16: EAB). Comparative Example I shows mechanical properties which are worse in comparison with the other examples.

EXAMPLES 17–18

A rubber mixture of 100 parts EPDM, 50 phr carbon black and 10 phr paraffinic oil was mixed on a 1-liter Banbury-mixer over 5 minutes at 120° C. 4.2 phr of a 40% formulation of bis(tert-butylperoxyisopropyl)benzene, BCI-C2 and WSP were added to the rubber mixture on a two-roll mill (friction ratio 1:1.2) over 5 minutes at 40° C. The results of the rheological measurements during vulcanization at 180° C. are listed in Table 7.

TABLE 7

| Ex. no. | BCI-C2 (phr) | WSP (phr) | $t_s2$ (min) | $t_{90}$ (min) | $t_s2/t_{90}$ | $\Delta$torque (N.m) |
|---|---|---|---|---|---|---|
| control | — | — | 1.06 | 8.48 | 0.125 | 7.12 |
| 17 | 1 | 0.85 | 1.33 | 8.31 | 0.16 | 6.92 |
| 18 | 2 | 1.7 | 1.50 | 7.50 | 0.20 | 7.03 |

$t_{90}$: vulcanization time
torque: measure of crosslink density

The addition of a biscitraconimido compound and WSP to rubber compositions gives a longer scorch time without significantly changing the vulcanization time or the crosslink density.

EXAMPLES 19–20

A rubber mixture of 100 parts EPDM, 50 phr carbon black and 10 phr paraffinic oil was mixed on a 1-liter Banbury-mixer over 5 minutes at 120° C. 4.2 phr of a 40% formulation of bis(tert-butylperoxyisopropyl)benzene, BCI-C3 and an antioxidant were added to the rubber mixture on a two-roll mill (friction ratio 1:1.2) over 5 minutes at 40° C. The results of the rheological measurements during vulcanization at 180° C. are listed in Table 8.

TABLE 8

| Ex. no. | BCI-C3 (phr) | anti-oxidant (phr) | $t_s2$ (min) | $t_{90}$ (min) | $t_s2/t_{90}$ | $\Delta$torque (N.m) |
|---|---|---|---|---|---|---|
| control | — | — | 1.1 | 9.0 | 0.12 | 9.8 |
| 19 | 1.1 | BHT (1.8) | 1.3 | 8.3 | 0.16 | 9.7 |
| 20 | 1.2 | TQ (1.3) | 1.3 | 8.9 | 0.15 | 9.7 |

$t_{90}$: vulcanization time
torque: measure of crosslink density

The addition of a biscitraconimido compound and an antioxidant to rubber compositions gives a longer scorch time without significantly changing the vulcanization time or the crosslink density.

EXAMPLES 21–22 AND COMPARATIVE EXAMPLE J

A rubber mixture of 100 parts EPDM, 50 phr carbon black and 10 phr paraffinic oil was mixed on a 1-liter Banbury-mixer over 5 minutes at 120° C. 4.2 phr of a 40% formulation of bis(tert-butylperoxyisopropyl)benzene, a coagent and MBTS were added to the rubber mixture on a two-roll mill (friction ratio 1:1.2) over 5 minutes at 40° C. The results of the rheological measurements during vulcanization at 180° C. are listed in Table 9.

TABLE 9

| Ex. no. | coagent (phr) | MBTS (phr) | $t_s2$ (min) | $t_{90}$ (min) | $t_s2/t_{90}$ | $\Delta$torque (N.m) |
|---|---|---|---|---|---|---|
| control | — | — | 1.1 | 9.0 | 0.12 | 9.8 |
| 21 | BCI-C3 (1.1) | 0.65 | 1.5 | 8.1 | 0.17 | 8.9 |
| 22 | BCI-C3 (2.2) | 0.65 | 1.4 | 8.4 | 0.17 | 9.4 |
| J | TAC (2.0) | 0.65 | 2.0 | 11.4 | 0.18 | 6.5 |

$t_{90}$: vulcanization time
torque: measure of crosslink density

The addition of a biscitraconimido compound and MBTS to rubber compositions does not significantly change the vulcanization time or the crosslink density in comparison with the combination of TAC and MBTS which shows a very low crosslink density together with a long vulcanization time in the rubber composition (Comparative Example J).

EXAMPLE 23 AND COMPARATIVE EXAMPLE K

A rubber mixture was made of 100 parts EVA, 2 phr zinc oxide, 0.5 phr stearic acid and 2 phr azodicarbonamide as blowing agent in a Banbury mixer at 150° C. over 5 minutes. 2 phr of a 40% formulation of bis(tert-butylperoxyisopropyl)benzene, a coagent and TBHQ were added in a two roll mill (friction ratio 1:1.2) to the rubber mixture at 50° C. over 5 minutes, prior to vulcanization. The result was a white colored foamed rubber. The rheological measurements were made at a temperature of 170° C. with a Göttfert-elastograph (International Standard ISO 6502). The results are listed in Table 10.

TABLE 10

| Ex. no. | TBHQ (phr) | coagent (phr) | $t_{10}$ (min) | $t_{90}$ (min) | $t_{10}/t_{90}$ |
|---|---|---|---|---|---|
| 23 | 0.15 | BCI-C2 (1) | 2.3 | 10.6 | 0.22 |
| K | 0.15 | HVA-2 (1) | 1.1 | 10.8 | 0.1 |

$t_{10}$: Time wherein 10% of the rubber is crosslinked.
$t_{90}$: Time wherein 90% of the rubber is crosslinked.

The addition of a biscitraconimido compound to a rubber composition before crosslinking gives a big improvement in scorch time as measured by t10. Furthermore, the use of HVA-2 gives a colouring of the white foam during crosslinking in comparison with the use of BCI-C2.

We claim:

1. A peroxide-vulcanized rubber composition which comprises the vulcanization reaction product of:
   (A) 100 parts of at least one natural or synthetic rubber;
   (B) 0.04 to 10 parts by weight of an organic peroxide;
   (C) 0.5 to 10 parts by weight of a biscitraconimido compound represented by formula I:

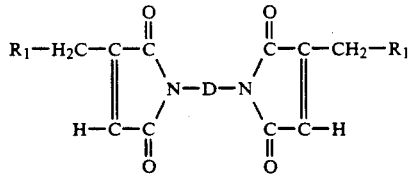

wherein D is a divalent group chosen from the group of alkylene, alkarylene, cycloalkylene, arylene, aralkylene, and alkenylene, and $R_1$ is hydrogen or an alkyl group with 1-18 carbon atoms; and
   (D) 0.1 to 10 parts by weight of a radical scavenger, all amounts based on the weight of said rubber.

2. The peroxide-vulcanized rubber composition according to claim 1, wherein said radical scavenger is an antioxidant.

3. The peroxide-vulcanized rubber composition according to claim 2, wherein said antioxidant is a phenolic compound.

4. The peroxide-vulcanizable rubber composition according to claim 1, wherein the radical scavenger is a mercapto derivative.

5. A process for the vulcanization of a vulcanizable rubber composition containing 100 parts of at least one natural or synthetic rubber with 0.04 to 10 parts by weight of an organic peroxide, comprising the step of vulcanizing said rubber at a temperature of from 80° to 300° C. for a period of 30 seconds up to 10 hours to crosslink the rubber composition, characterized in that said vulcanizable rubber composition further comprises 0.5 to 10 parts by weight of a biscitraconimido compound represented by formula I:

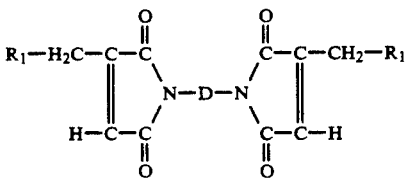

wherein D is a divalent group chosen from the group of alkylene, alkarylene, cycloalkylene, arylene, aralkylene, and alkenylene, and $R_1$ is hydrogen or an alkyl group with 1-18 carbon atoms; and 0.1 to 10 parts by weight of a radical scavenger, all amounts based on the weight of said rubber.

6. The process in accordance with claim 5 wherein the vulcanization is carried out at a temperature of from about 120°-180° C. for a period of 2 minutes up to 2 hours.

7. The process in accordance with claim 5 wherein the radical scavenger is an antioxidant.

8. The process in accordance with claim 7 wherein said antioxidant is a phenolic compound.

9. A method of controlling scorch time in peroxide-cured rubber vulcanization which comprises conducting said vulcanization in the presence of a biscitraconimido compound represented by formula I:

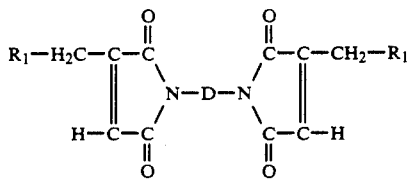

wherein D is a divalent group chosen from the group of alkylene, alkarylene, cycloalkylene, arylene, aralkylene, and alkenylene, and $R_1$ is hydrogen or an alkyl group with 1-18 carbon atoms; and a radical scavenger.

10. The method of claim 9 wherein said vulcanization is carried out at a temperature of from about 120°-180° C. for a period of 2 minutes up to 2 hours.

11. The method of claim 9 wherein said radical scavenger is an antioxidant.

12. The method of claim 11 wherein said antioxidant is a phenolic compound.

13. The method of claim 9 wherein said radical scavenger is a mercapto derivative.

* * * * *